United States Patent
Braun et al.

(10) Patent No.: US 7,399,793 B2
(45) Date of Patent: *Jul. 15, 2008

(54) COATING COMPOSITION CURABLE WITH ULTRAVIOLET RADIATION

(75) Inventors: David W. Braun, Whitehouse, OH (US); Michelle Odajima, Toledo, OH (US); Thomas J. Laginess, Temperance, MI (US)

(73) Assignee: BASF Corporation, Southfield, MI (US)

( * ) Notice: Subject to any disclaimer, the term of this patent is extended or adjusted under 35 U.S.C. 154(b) by 590 days.

This patent is subject to a terminal disclaimer.

(21) Appl. No.: 10/698,887

(22) Filed: Oct. 31, 2003

(65) Prior Publication Data

US 2005/0095371 A1   May 5, 2005

(51) Int. Cl.
C08F 2/46 (2006.01)
C08F 2/50 (2006.01)
C08J 3/28 (2006.01)
B05D 1/00 (2006.01)

(52) U.S. Cl. ............... 522/120; 522/113; 522/114; 522/121; 522/90; 522/96; 522/104; 522/106; 522/150; 522/151; 522/153; 522/154; 522/162; 427/508; 427/516; 427/512; 427/518; 427/558; 427/553; 427/556; 427/402; 427/407.1

(58) Field of Classification Search ............... 522/96, 522/90, 182, 113, 114, 121, 178, 120, 104, 522/106, 154, 162; 427/402, 407.1, 508, 427/516, 512, 518, 558, 553, 556

See application file for complete search history.

(56) References Cited

U.S. PATENT DOCUMENTS

| | | | | |
|---|---|---|---|---|
| 5,231,524 A * | 7/1993 | De Keyzer et al. | .......... | 349/122 |
| 5,425,970 A * | 6/1995 | Lahrmann et al. | .......... | 427/493 |
| 5,486,384 A * | 1/1996 | Bastian et al. | .......... | 427/493 |
| 5,532,286 A * | 7/1996 | Burns et al. | .......... | 522/37 |
| 5,932,282 A * | 8/1999 | Diener et al. | .......... | 427/140 |
| 6,153,430 A | 11/2000 | Pastan et al. | | |
| 6,261,645 B1 | 7/2001 | Betz et al. | | |
| 6,332,291 B1 | 12/2001 | Flosbach et al. | | |
| 6,333,077 B1 | 12/2001 | Maag et al. | .......... | 427/496 |
| 6,506,823 B2 * | 1/2003 | Burns et al. | .......... | 524/35 |
| 6,509,398 B1 | 1/2003 | Allard et al. | .......... | 524/91 |
| 6,677,045 B1 * | 1/2004 | Meisenburg et al. | .......... | 428/424.2 |
| 6,838,177 B2 * | 1/2005 | Fenn et al. | .......... | 428/414 |
| 6,991,833 B2 * | 1/2006 | Krohn | .......... | 427/514 |
| 2003/0059555 A1 * | 3/2003 | Fenn et al. | .......... | 427/558 |
| 2005/0100685 A1 * | 5/2005 | Flosbach et al. | .......... | 428/31 |

FOREIGN PATENT DOCUMENTS

| | | |
|---|---|---|
| DE | 2812083 | 11/1979 |
| DE | 199 20 801 | 11/2000 |
| DE | 10027268 | 12/2001 |
| DE | 10130972 | 11/2002 |
| WO | WO9411123 | 5/1994 |
| WO | WO00/67919 | 11/2000 |
| WO | WO0138427 | 5/2001 |
| WO | WO03061849 | 7/2003 |

OTHER PUBLICATIONS

English abstract for DE10027268 from EPO Dec. 13, 2001.
Derwent Accession No. 1979-56352B, English abstract for DE2812083, Jul. 26, 1979.
U.S. Appl. No. 10/129,539, filed May 8, 2002, Grefenstein et al.
U.S. Appl. No. 10/479,033, filed Nov. 26, 2003, Baumgart et al.
International Search Report PCT/US2004/033830 filed Oct. 14, 2004.
English Translation U.S. Appl. No. 10/009,394, filed Oct. 25, 2001, Allard, et al., pp. 1-28.

* cited by examiner

Primary Examiner—Sanza L McClendon

(57) ABSTRACT

A clearcoat curable by ultraviolet radiation including at least one of A) acrylate or methacrylate monomers or mixtures thereof having from one to six free-radically polymerizable groups per molecule or B) compounds containing two or more ethylenically unsaturated, free radically polymerizable groups per molecule and mixtures thereof or mixtures of A) and B). The coating may optionally include photoinitiators, volatile organic solvent(s) and customary additives. The invention further provides a process for applying the clearcoat to a substrate. In a preferred embodiment the process according to the present invention includes low energy curing of a clearcoat applied to a substrate by means of a UV light source utilizing UVA/UVV or UVA only and involves essentially no UVB or UVC radiation.

11 Claims, No Drawings

COATING COMPOSITION CURABLE WITH ULTRAVIOLET RADIATION

BACKGROUND OF THE INVENTION

Clearcoat compositions for basecoat/clearcoat coatings have been used in vehicle finishing since the 1970's. The clearcoat is the final coating layer and generally functions to impart gloss and provide weathering protection. Clearcoat compositions must be sufficient in properties such as transparency, low color, gloss, adhesion, hardness, flexibility and resistance to UV degradation. In a coatings process, the process often involves applying layers of primer, basecoat and clearcoat.

Common clearcoat compositions comprise active-hydrogen functional polymers or oligomers, which include acrylics and polyesters. The functional groups are typically hydroxyl, carboxylic acid and amine. Reaction partners are typically isocyanates and aminoplast resins.

Both one-component and two-component clearcoat compositions are known in the art. Two-component compositions generally include an active hydrogen component and an unblocked crosslinker, where these components are mixed immediately prior to application of the coating to a substrate. If the coating is cured under ambient conditions, typically the coating must cure for 12-24 hours before adequate chemical, solvent and scratch resistance is obtained. One-component coatings typically contain an active hydrogen component and a crosslinker such as an aminoplast or blocked isocyanate. These coatings are typically cured by heat.

UV Radiation curable coatings are described in Canadian Patent 2,214,281. This application describes a clearcoat coating hardenable exclusively by radical polymerization, or cationic polymerization, or by both radical and cationic polymerization. In each case hardening is affected by means of pulsed, high-energy UV radiation provided by a high-energy photoflash lamp, with a UV wavelength of 200-900 nm. The electrical energy per flash discharge is between 1-10 kJoules. The present invention is distinguished from the reference for the reason that the invention does not utilize high-energy photoflash lamps to cure the composition.

Other clearcoat compositions curable by UV radiation are described in U.S. Pat. No. 6,333,077 which defines a dual cure clearcoat, curable by both thermal energy and UV radiation. The instantly claimed invention is distinguished from the patent for the reason that it teaches application of the clearcoat over a wet basecoat, exposing the topcoat to UV radiation for partial cure and then jointly stoving the base and clear coats, whereas the instantly claimed invention teaches curing by UV radiation only with no need for thermal cure.

Patent application PCT/EP00/03267 (WO 00/67919) describes a multicoat clearcoat system produced by applying a clearcoat film that is curable thermally and with actinic radiation and partially curing, followed by applying a further clearcoat film of a different coating material comprising nanoparticles and curable with actinic radiation and optionally thermally curable that is cured by jointly curing the first and second clearcoat films with actinic radiation and thermally. The instantly claimed invention does not utilize thermal curing of the clearcoat films.

U.S. Pat. No. 6,509,398 describes an acrylic varnish suitable for coating polycarbonate or polymethylmethacrylate, curable by UV radiation. The coating contains an antioxidant comprising a sterically hindered phenol. The instantly claimed invention does not utilize a sterically hindered phenol antioxidant as claimed in the reference.

U.S. Pat. No. 5,486,384 describes a process for producing a multi-layer coating over dry basecoat where the coating is applied in the absence of all light having a wavelength below 550 nm and then the coating is exposed to high-energy radiation to polymerize the coating agent and cure the coating agent layer on the basecoat. The instantly claimed invention is distinguished from the reference for the reason that the coating defined herein is not applied in the absence of all light having a wavelength below 550 nm and may be cured by low energy radiation only.

The present invention provides a one-component clearcoat coating composition curable under ultraviolet light and a process for applying the composition to the substrate. The coating dries quickly, provides good weathering characteristics, solvent and impact resistance and adequate hardness.

SUMMARY OF THE INVENTION

The present invention defines a one-component coating curable under ultraviolet (UV) light and a process for applying the composition to the substrate. When the composition is applied and cured with sufficient exposure to UV radiation according to the invention, a hard coating providing resistance to chemicals is obtained. The level of cure to obtain these properties is achieved much more quickly with the present system in comparison to two component compositions. In application environments with proper safety controls in place, the coating may be cured with UVC, UVB, UVA, and/or UVV. Preferably, the process according to the present invention includes curing a clearcoat applied to a substrate by means of a UV light source utilizing UVA/UVV or UVA only and involves essentially no UVB or UVC radiation. Elimination of UVB and UVC radiation makes the process safer and eliminates the need for a controlled application environment. Additionally, the clearcoat films of the present invention are cured with low energy radiation, ranging from 0.01 to 200 mW/cm$^2$. Possible light sources include, but are not limited to natural outdoor light, black lights, fluorescent lights, or high pressure mercury lights. The clearcoat provides a tack free surface after curing under these conditions and exhibits high gloss, good weathering characteristics, solvent and impact resistance.

The present invention further describes a process for applying a clearcoat composition to a substrate comprising the steps of i) applying a UV clearcoat to the substrate to be coated; ii) exposing the coating to ultraviolet radiation provided by one or more UV lamps providing irradiance levels to the coating of from 0.01 to 200 mW/cm$^2$ or less. The process is highly effective for curing automotive substrates in an OEM facility, a refinish bodyshop, or other transportation vehicle facilities. Little or no organic solvent is emitted during the application and cure of the clearcoat and the clearcoat can be applied and cured in a very short time.

DETAILED DESCRIPTION

This invention relates to a clearcoat composition and a method of applying a clearcoat composition to a substrate. The UV radiation curable clearcoat comprises at least one compound selected from the group consisting of A) 0.1-99.90% by weight of one or more compounds comprising acrylate or methacrylate monomers or mixtures thereof having from one to six free-radically polymerizable groups per molecule and B) 0.1 to 99.9% by weight of one or more compounds containing two or more ethylenically unsaturated, free radically polymerizable groups per molecule and mixtures thereof, and mixtures of A) and B). The coating further comprises compounds selected from the group consisting of C) from 0.1 to 10.0% by weight of one or more photoinitiators; D) 0-70% by weight of volatile organic solvent(s) and E) 1-15% by weight of customary additives. All weights are based on total coating composition weight. All ranges of amounts are intended to include each and every point within the range.

In a preferred embodiment the clearcoat contains A) 1 to 50% by weight of one or more compounds comprising acrylate or methacrylate monomers or mixtures thereof having from 1 to 6 free-radically polymerizable groups per molecule; B) 30 to 80% by weight of one or more compounds containing two or more ethylenically unsaturated, free radically polymerizable groups per molecule selected from the group consisting of urethane acrylates and methacrylates, polyester acrylates and methacrylates, melamine, acrylic amine, cellulose based acrylates and methacrylates and unsaturated polyesters; C) from 1 to 5.0% by weight of one or more photoinitiators; D) 20-50% by weight of volatile organic solvent and; D) 1-15% by weight of customary additives. In general, the type and level of component A is chosen to impart hardness, fast cure and higher solids. The choice and level of component B is chosen to provide flexibility, adhesion and higher solids. Preferably the ethylenically unsaturated groups in component A and component B are principally acrylate groups as this results in rapid cure rate.

Examples of compounds suitable as component A include monoacrylate monomers such as octyl-decyl monoacrylate, isobornyl monoacrylate and isodecyl monoacrylate, diacrylate monomers such as hexanediol diacrylate or tripropyleneglycol diacrylate, triacrylates such as trimethylolpropane triacrylate, alkoxylated trimethylolpropane triacrylate or pentaerythritol triacrylate, polyacrylates such as pentaerythritol tetraacrylate pentaerythritol pentaacrylate or dipentaerythritol hexaacrylate, and mixtures of any of the above.

Examples of compounds suitable as component B include compounds selected from the group consisting of urethane acrylates, polyester acrylates and methacrylates, melamine, acrylic amine, cellulose based acrylates and methacrylates and unsaturated polyesters and mixtures thereof. Urethane acrylate include, but are not limited to compounds such as Ebecryl 8402, Ebercyl 5129, or Ebercryl 1290 and Ebercryl 8301, available from UCB chemicals or Actilane 251, Actilane 270, Actilane 276 and Actilane 280 available from Akcros Chemicals or CN 292 from Sartomer Company. Preferably component B comprises one or more urethane acrylates, or one or more polyester acrylates or mixtures thereof.

Component C can be any photoinitiator capable of generating free radicals when exposed to radiation having a UVB: UVV:UVA of 1:1:1, more preferably a ratio of 0:0.5:1. Preferred photoinitiators are acyl phosphine oxides, for example Irgacure 819, available from Ciba Specialty Chemicals or Lucirin TPO or Lucirin TPO-L available from BASF Corp., benziketals such as Irgacure 651 from Ciba Specialty Chemicals, alpha-hydroxy ketones such as Irgaure 184 or Darocur 1173 available from Ciba Specialty Chemicals or mixtures thereof. The volatile organic solvent can be any solvent that will dissolve all other components in the clearcoat composition. It can be an aliphatic or aromatic hydrocarbon such as Solvesso® 100(TM) or Oxsol® 100, toluene or xylene, an alcohol such as n-butanol or isopropanol, an ester such as methyl acetate, n-propyl acetate, iso-butyl acetate, n-butyl acetate, ethyl acetate, ethyl propionate, n-butyl propionate, or n-pentyl propionate, a ketone such as acetone, methyl isobutyl ketone or methyl ethyl ketone, an ether, an ether-alcohol or an ether-ester such as ethyl 3-ethoxypropionate, propylene glycol methyl ether, propylene glycol ethyl ether, propylene glycol n-propyl ether or propylene glycol t-butyl ether or a mixture of any of these.

The level and type of solvent used will depend on the viscosity of the other components and the intended application method.

The clearcoat composition may also contain conventional additives such as photosynergists, ultraviolet absorbers, hindered amine light stabilizers, adhesion promoters, flow aids, wetting aids and rheology modifiers.

The process of applying a clearcoat to a substrate comprises the steps of i) providing a substrate having at least one coating thereon, ii) applying a UV clearcoat to the substrate to be coated; iii) exposing the coating to ultraviolet radiation provided by one or more UV lamps delivering an irradiance level of 0.01 to 200 mW/cm$^2$ to the coating for a time between 1 second and 30 minutes. Preferably, an irradiance level of 1 to 100 mW/cm$^2$ to the coating for a time between 30 seconds and 10 minutes is used to obtain a tack free surface. The irradiance is given in the UVA range with following ratios—UVV:UVA of 1:1 or less, UVB:UVA 1:1 or less, UVC:UVA of 1:1 or less. The wavelengths may also be UVV:UVA 1:1 or less, UVB: UVA 1:1 or less, with substantially no UVC. Preferably, the irradiances levels are UVV:UVA 0.5:1 or less, UVB:UVA 0.5:1 or less, with substantially no UVC. More preferably, the irradiance levels are UVV:UVA 1:1 or less or UVA only, with substantially no UVC and UVB.

UVA radiation is any radiation falling within the 320-400 nm wavelength interval, UVB radiation is any radiation falling within the 280-320 nm wavelength, UV-C radiation is any radiation falling within the 100-280 nm wavelength interval and UVV radiation is any radiation falling within the 400-750 nm wavelength interval.

The clearcoat may be applied over any primer and or basecoat system in order to achieve the desired final color and appearance. For example the clearcoat can be coated over a waterborne basecoat such as 90-Line available from BASF Corporation or a solventborne basecoat such as 55-Line available from BASF Corporation. The coating is applied by means such as brush, roller, sponge, spray gun or aerosol, preferably spray gun or aerosol. The substrate can be for example metal, plastic, wood or glass. A suitable dry film thickness ranges from 5 to 125 microns. Preferably, from 5 to 75 microns.

According to the present invention there is a process provided for coating a coated or partially coated substrate, a spot repair application, OEM automotive paint applications, and other transportation vehicle paint applications.

The invention is illustrated by means of the following examples.

EXAMPLES

Example 1

Resin Mixtures:

Dipentaerythritol Pentacrylate Monomer, Trifunctional Urethane Acrylate and Octyl-decyl monoacrylate were combined to form the resin portion of the clearcoat composition in the following ratios:

| | Dipentaerythritol Pentacrylate Monomer | Trifunctional Urethane Acrylate | Octyl-decyl monoacrylate | Gloss (20°) | Film build (Microns) |
|---|---|---|---|---|---|
| 1 | 0.20 | 0.6 | 0.20 | 81 | 2.8 |
| 2 | 0.20 | 0.67 | 0.13 | 81.1 | 2.3 |
| 3 | 0.22 | 0.64 | 0.14 | 79.7 | 2.05 |
| 4 | 0.22 | 0.68 | 0.10 | 75.1 | 2.2 |
| 5 | 0.25 | 0.75 | 0.00 | 67.6 | 1.85 |

Clearcoat Coating Compositions

A clearcoat coating formulation was prepared by combining the following ingredients:

| Ingredient | Amount (grams) |
|---|---|
| Resin Mixture From Table 1 | 42.0 |
| Solvent | 14.7 |
| Rheology Control Agent BYK 325 (modified polydimehtyl siloxane) | 0.36 |
| Polyacrylate Flow Agent Byk 358 | 0.21 |
| Tinuvin 292 (Hindered amine light stabilizer) | 0.63 |
| Tinuvin 400 (hydroxyl phenyltriazine derivative) | 0.42 |
| Irgacure 184 (alpha-hydroxy ketone) | 1.4 |
| Irgacure 819 (Bis acyl phosphine oxide) | 0.28 |
| Total | 60 g |

The ingredients were mixed and sprayed onto white basecoated panels and cured for 4 minutes under UVA energy 0.090 w/cm$^2$ and UVV energy 0.053 w/cm$^2$.

TABLE 1

Evaluation of Clearcoats for Weathering SAEJ1960.

| Sample | Original 20 degree Gloss | 3000 kJ Gloss |
|---|---|---|
| 1 | 81 | 71.2 |
| 2 | 81.1 | 81.2 |
| 3 | 79.7 | 76.2 |
| 4 | 75.1 | 76.7 |
| 5 | 67.6 | 69.9 |

Clearcoats had no cracking at 3000 kJ and no gloss loss.

The invention claimed is:

1. A UV radiation curable clearcoat coating composition consisting essentially of:
   at least one compound selected from A) and B) wherein:
   A) comprises 0.1% to 99.9% by weight of one or more compounds selected from the group consisting of acrylate and methacrylate monomers having from 1 to 6 free-radically polymerizable groups per molecule and mixtures thereof; and
   B) comprises 0.1 to 99.9% by weight of one or more compounds containing two or more ethylenically unsaturated, free radically polymerizable groups per molecule selected from the group consisting of urethane acrylates and methacrylates, polyester acrylates and methacrylates, melamine, acrylic amine, cellulose based acrylates and methacrylates and unsaturated polyesters and mixtures thereof;
   and further comprising:
   C) from 0.1 to 10.0% by weight of one or more photoinitiators;
   D) from 0 to 70% of compounds selected from the group consisting of solvents; and
   E) from 1 to 15% of compounds selected from the group consisting of photosynergists, ultraviolet absorbers, hindered amine light stabilizers, adhesion promoters, flow aids, wetting aids, rheology modifiers and mixtures thereof;
   wherein the coating is cured with a UV source providing a UV radiation with UVV:UVA of 1:1 or less, UVB:UVA of 1:1 or less, and UVC:UVA of 1:1 or less; further wherein the coating is cured with an irradiance level between 0.01 and 200 mW/cm$^2$ for a time of between 1 second and 30 minutes to obtain a non-tacky surface.

2. A UV radiation curable clearcoat coating composition according to claim 1 wherein the compound A is selected from the group consisting of octyl-decyl monoacrylate, isobornyl monoacrylate, isodecyl monoacrylate, hexanediol diacrylate, tripropyleneglycol diacrylate, trimethylolpropane triacrylate, alkoxylated trimethylolpropane triacrylate, pentaerythritol triacrylate, pentaerythritol tetraacrylate pentaerythritol pentaacrylate, dipentaerythritol hexaacrylate, and mixtures thereof above.

3. A UV radiation curable clearcoat coating composition according to claim 1 wherein compound B is selected from the group consisting of urethane acrylates, polyester acrylates and methacrylates, melamine, acrylic amine, cellulose based acrylates and methacrylates and unsaturated polyesters and mixtures thereof.

4. A UV radiation curable clearcoat composition according to claim 1 comprising compound A) in an amount from 1 to 50% by weight, compound B) in an amount from 30 to 80% by weight, and D) 20-50% by weight of volatile organic solvent.

5. A UV radiation curable clearcoat composition according to claim 1 wherein contains one or more photoinitiators curable by radical polymerization.

6. A UV radiation curable clearcoat coating composition according to claim 1 wherein the coating is cured with an irradiance level of between 1 and 100 mW/cm$^2$ for a time of between 30 seconds and 10 minutes to obtain a non-tacky surface.

7. A UV curable clear coating composition according to claim 1 wherein the coating is cured with a UV source providing substantially no UVC.

8. A UV curable clear coating composition according to claim 1 wherein the coating is cured with a UV source providing UV irradiation with UVV:UVA of 0.5:1 or less, UVB:UVA of 0.5:1 or less, and with substantially no UVC.

9. A UV curable clear coating composition according to claim 1 wherein the coating is cured with a UV source providing UV irradiation with UVV:UVA of 1:1 or less, and with substantially no UVB and UVC.

10. A UV curable clear coating composition according to claim 1 wherein the coating is cured with a UV source providing UV irradiation with UVA only, and with substantially no UVV, UVB, and UVC.

11. A UV radiation curable clearcoat coating composition according to claim 1 wherein compound A comprises a mixture of octyl-decyl monoacrylate and pentaerythritol pentaacrylate.

* * * * *